Patented Mar. 26, 1935

1,995,607

UNITED STATES PATENT OFFICE 1,995,607

PROCESS FOR THE PRODUCTION OF CALCIUM FORMATE

Max Enderli, Oestrich, Germany, assignor to firm Rudolph Koepp & Co. Chemische Fabrik A. G., Oestrich, Germany, a corporation of Germany No Drawing. Application August 9, 1933, Serial No. 684,399. In Germany August 13, 1932

5 Claims. (Cl. 260—114)

A process is known for the production of alkaline earth formates by the action of carbon monoxide or carbon monoxide-containing gases on alkaline earths, for example caustic lime, at elevated temperatures and at elevated pressures wherein the reaction is promoted by the presence of alkali metal formates, not more than about 30 parts of an alkali metal formate being employed per 100 parts by weight of alkaline earth hydroxide. The alkali metal formates may be added as such or may be produced during the process from substances such as caustic alkalies, which are capable of forming under the conditions of the reaction alkali metal formates by fixing carbon monoxide.

According to an embodiment of this process the alkaline earth hydroxide is employed as an aqueous suspension or in the form of a paste, the reaction being carried out, if desired, by adding so much alkaline earth formate that a saturated solution is obtained from which the newly formed alkaline earth formate can immediately separate out.

It has now been found that in treating lime in the form of an aqueous suspension or a liquid aqueous paste the speed of reaction may be further considerably increased by the presence of quantities of alkali metal formate greater than those hereinbefore referred to. This is of great importance since when employing, as is usual, stirring apparatus, which permit of the use of only a limited excess pressure of carbon monoxide, the speed of reaction of the process for the production of calcium formate is relatively small and the efficiency of the plant consequently not very great.

The advantageous effects of the present process are obvious from the following comparative experiments, in which in each case 500 litres of a 6% milk of lime were treated under thorough mixing with carbon monoxide at 185° C. under a partial pressure of 8 atms., increasing amounts of potassium or sodium formate being added as accelerators. If the measured speed of reaction of the formation of calcium formate from caustic lime and carbon monoxide without any addition is taken as 100 then the following comparative values for the addition of alkali formate are found:

| Addition—Potassium formate or sodium formate | Parts of potassium formate or sodium formate per 100 parts of calcium oxide | Speed of reaction | |
|---|---|---|---|
| | | Potassium formate | Sodium formate |
| 0 | 0 | 100 | 100 |
| 6 kg. | 20 | 125 | 115 |
| 9 kg. | 30 | 150 | 120 |
| 12 kg. | 40 | 172 | 140 |
| 30 kg. | 100 | 240 | 175 |
| 60 kg. | 200 | 250 | 210 |
| 180 kg. | 600 | 265 | 240 |

By a suitable selection of the working conditions the process can be carried out in such a manner that the calcium formate formed is obtained in the form of a suspension which can easily be separated from the mother liquor containing the potassium formate which has been used to accelerate the reaction.

Advantageously the potassium formate required for the reaction is produced from caustic alkali and carbon monoxide in situ by starting with a suspension of caustic lime in aqueous caustic alkali in such a proportion that more than 30 parts of an alkali metal formate per 100 parts of alkaline earth hydroxide are formed.

The alkali metal formate-containing mother liquor can be separated from the calcium formate in the usual manner and always be returned to the process by adding fresh amounts of lime. Any calcium formate which is still contained in the mother liquor may if desired be separated by crystallization before returning the mother liquor to the process.

What I claim is:

1. A process for the production of calcium formate, comprising causing carbon monoxide to act on caustic lime in aqueous suspension at formate producing temperatures and pressures in the presence of an alkali metal formate in quantities of more than 30 parts per 100 parts of caustic lime.

2. A process for the production of calcium formate, comprising causing carbon monoxide-containing gases to act on caustic lime in aqueous suspension at formate producing temperatures and pressures in the presence of an alkali metal formate in quantities of more than 30 parts per 100 parts of caustic lime.

3. A process for the production of calcium formate, comprising causing carbon monoxide to act on caustic lime in aqueous paste-like suspension at formate producing temperatures and pressures in the presence of an alkali metal formate in quantities of more than 30 parts per 100 parts of caustic lime.

4. A process for the production of calcium formate, comprising causing carbon monoxide to act on caustic lime at formate producing temperatures and pressures in the presence of an alkali metal formate in quantities of more than 30 parts per 100 parts of caustic lime, the concentrations being such that the calcium formate formed is obtained in solid form.

5. A process for the production of calcium formate, comprising causing carbon monoxide to act on caustic lime in aqueous suspension at formate producing temperatures and pressures in the presence of an alkali metal formate in quantities of more than 30 parts per 100 parts of caustic lime, under such conditions of concentration that the calcium formate formed is obtained in solid form, separating the calcium formate from the alkali metal formate-containing mother liquor and returning the alkali metal formate-containing mother liquor to the process.

MAX ENDERLI.